United States Patent [19]

Ricke

[11] 4,118,066
[45] Oct. 3, 1978

[54] APPARATUS FOR SHADING THE SEATS OF A VEHICLE

[75] Inventor: Cyril T. Ricke, Englewood, Fla.

[73] Assignee: Hex Fastener Corporation, Addison, Ill.

[21] Appl. No.: 768,221

[22] Filed: Feb. 14, 1977

[51] Int. Cl.² ............................................. A47C 7/00
[52] U.S. Cl. ................................. 297/184; 296/136
[58] Field of Search .................... 297/184; 160/23 R; 135/5 A; 296/136; 280/749

[56] References Cited

U.S. PATENT DOCUMENTS

| | | | |
|---|---|---|---|
| 1,536,005 | 4/1925 | Housteau | 160/23 R |
| 1,918,423 | 7/1933 | Persinger | 160/23 R |
| 2,517,927 | 8/1950 | Reed | 248/226.1 X |
| 2,531,563 | 11/1950 | Feldheim | 248/226.1 |
| 2,620,082 | 12/1952 | Harmon | 148/226.1 |
| 3,512,730 | 5/1970 | Board et al. | 297/388 |
| 3,756,652 | 9/1973 | Trammell, Jr. | 297/192 |
| 3,804,458 | 4/1974 | Jannoni | 297/DIG. 6 |

FOREIGN PATENT DOCUMENTS

| | | | |
|---|---|---|---|
| 14,626 of | 1890 | United Kingdom | 297/184 |
| 389,958 | 3/1933 | United Kingdom | 297/184 |

*Primary Examiner*—James T. McCall
*Attorney, Agent, or Firm*—Hauke and Patalidis

[57] ABSTRACT

An apparatus and method for shading from direct sun rays at least one seat of a vehicle. The apparatus consists of a spring-wound roller shade which is mounted, for example, to a portion of a seat, such as the bottom edge of the front of the front seat. The end of the shade, when unwound from the spring-wound roller, is attached to the top or beyond the top of the back of the seat. Preferably, the spring-wound roller is provided with a pair of support brackets clamping the bottom edge of the seat skirt, and the free end of the shade is provided with a length of mutually adhesive fabric removably engageable with a length of similar mutually adhesive fabric attached to a portion of the interior of the vehicle, such as the back of the seat. The spring-wound roller is attached to its mounting brackets such as to be laterally displaceable for adjusting the lateral position of the shade as a function of the exposure of the seat, or seats, to the sun rays. Alternatively, the shade may be extended over the front and corresponding rear seat, and the roller may be mounted in back of the rear seat or in back of the front seat.

7 Claims, 9 Drawing Figures

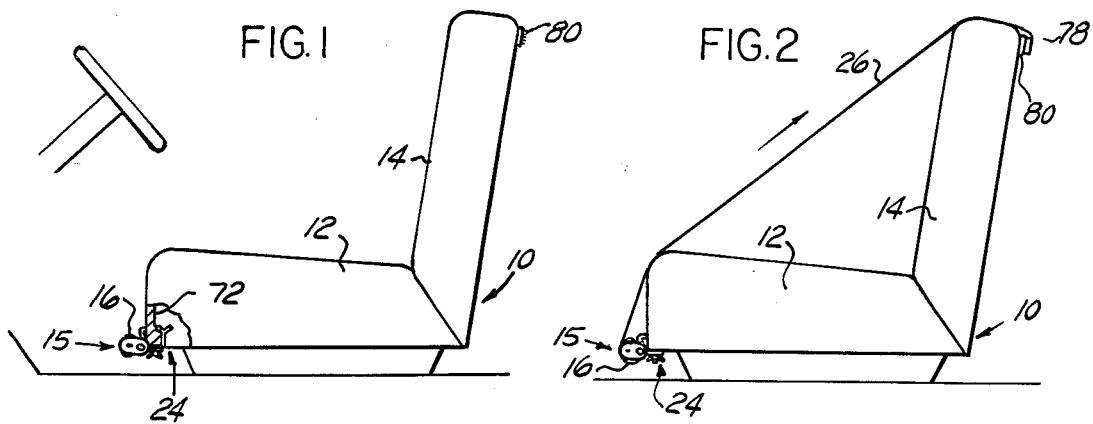
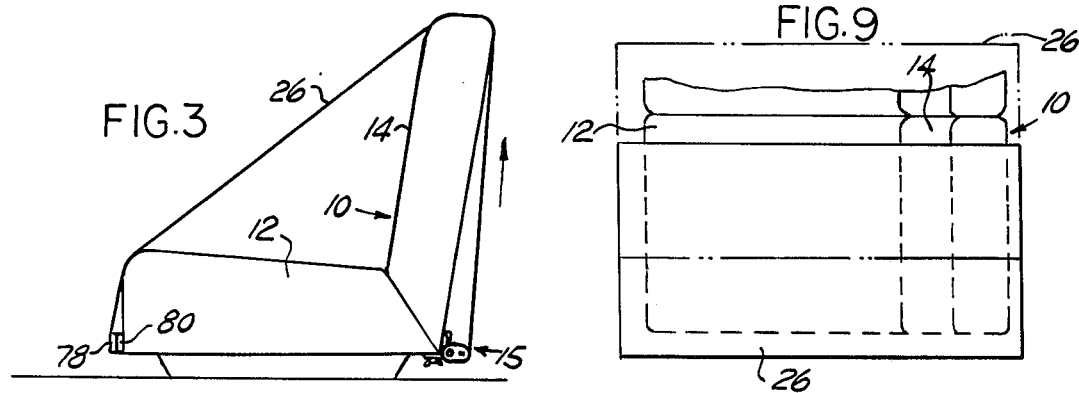
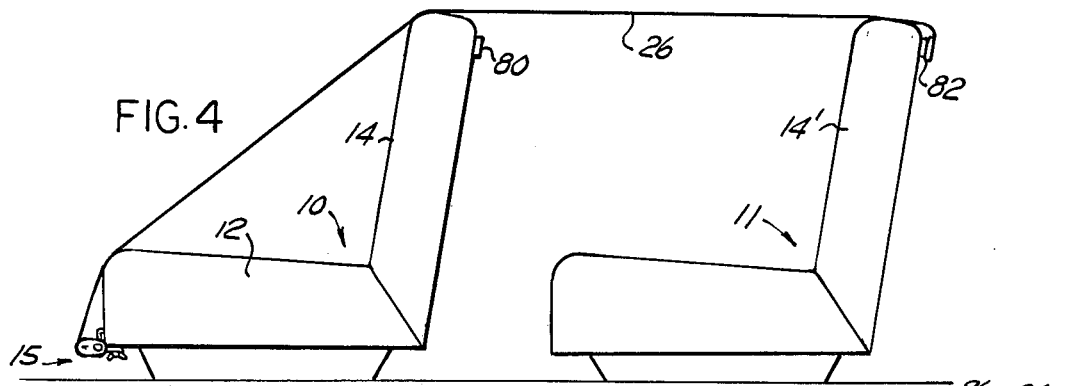
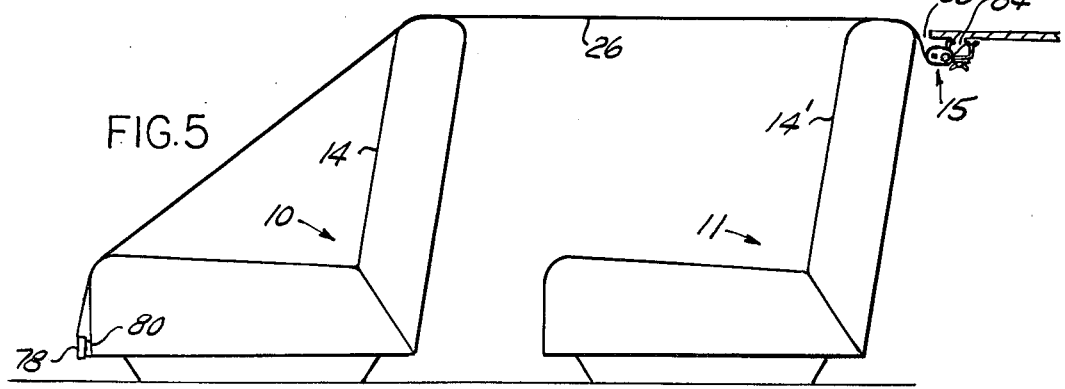

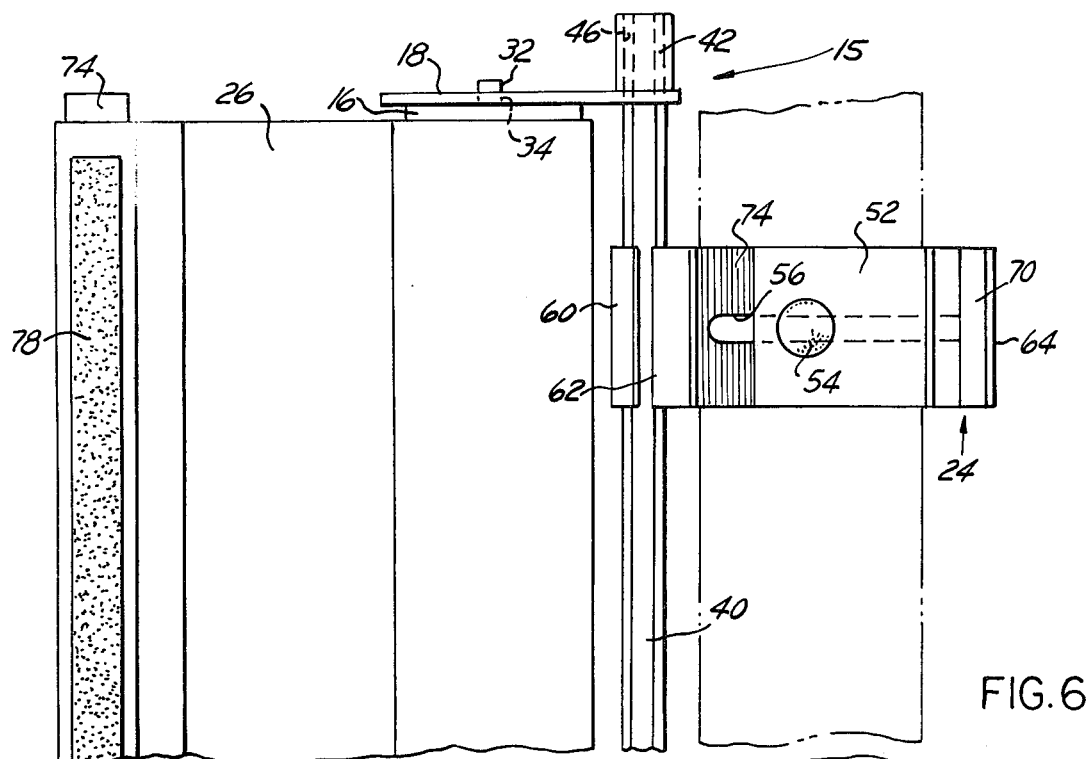
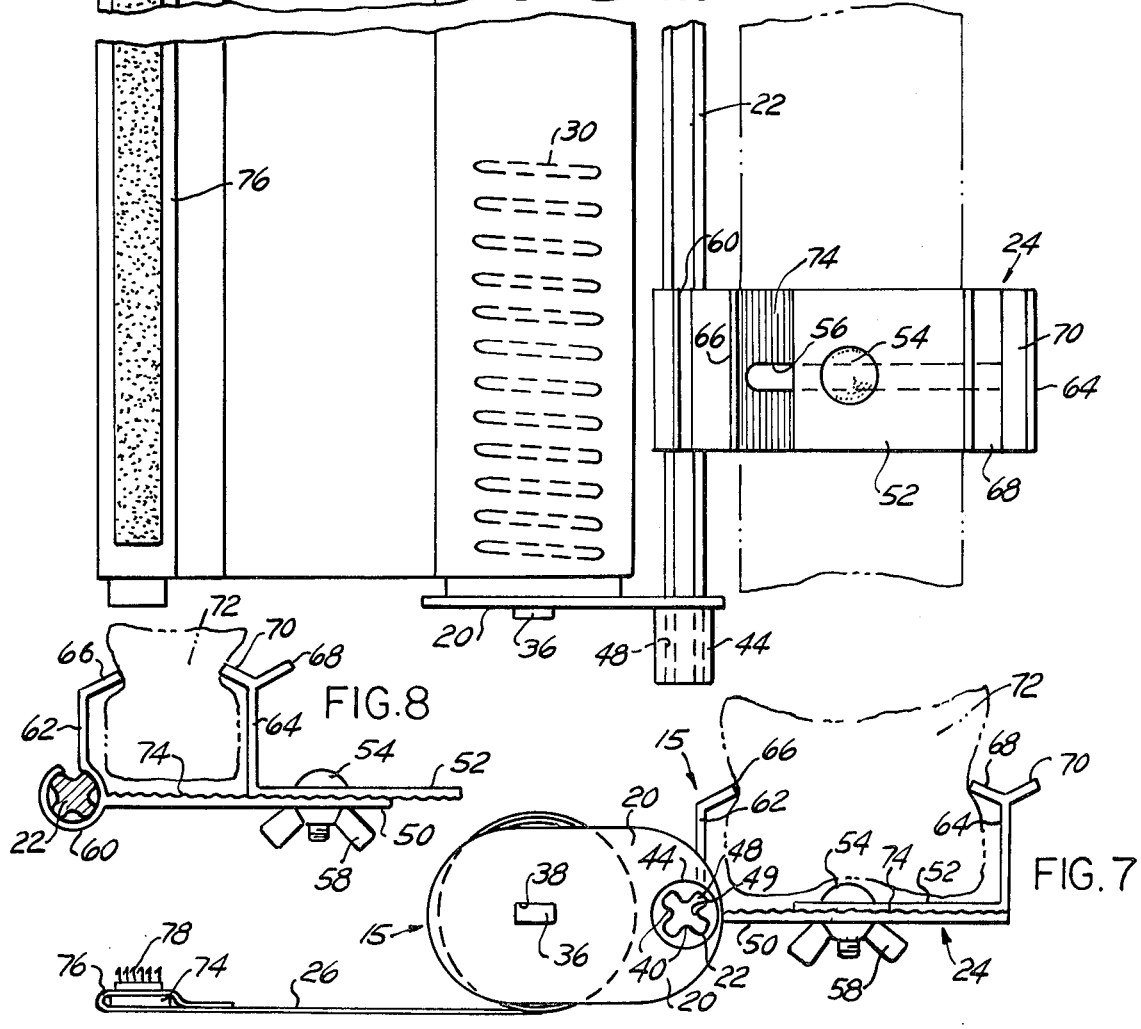

APPARATUS FOR SHADING THE SEATS OF A VEHICLE

BACKGROUND OF THE INVENTION

The present invention relates to an apparatus and method for shading the seats of a vehicle from impinging sun rays, such as to keep the upholstery of the seats relatively cool.

It is a well known fact that when a vehicle, such as an automobile, a truck, a bus, a railroad car, a farm tractor, or the like, is parked, or left unattended for a period of time in a location exposed to the direct action of the sun rays, the interior of the vehicle, when closed, becomes rapidly heated and, in addition, the upholstery of the seats is capable of absorbing a considerable amount of solar energy with the result that the seat proper, and often the back of the seat, becomes so hot that it is uncomfortable and sometimes even painful for a person to sit in the seat. Such disadvantages are particularly prevalent if the upholstery is dark and made of leather or leather-like plastic material. The seat of a convertible automobile, with the top down, after a few minutes of exposure to direct sun rays in the summer, or at any time of the year in some latitudes, may become so hot that it is painful for the driver and passengers to re-occupy the seats, especially when wearing light clothes or clothes leaving large areas of the skin uncovered. Even in motor vehicles provided with a permanent top, the seat proper and the seat back may be directly hit by sun rays passing through transparent areas of the vehicle body, such as the windshield and the rear and side windows.

Such inconveniences are remedied by the present invention which provides a retractable shade which may be extended over a single seat or several seats of a vehicle, out of contact with the upholstery of the seat proper and seat back, the end of the shade being removably attachable to a portion of the interior of the vehicle, such as, for example the back of a seat. The shade material being out of contact with the upholstery of the seat, even if made of heat absorbing dark material, does not communicate its absorbed heat to the upholstery, a relatively large cushion of air acting as an insulation between the shade material and the seat upholstery. To permit proper shading of the seat upholstery, the shade roller is mounted laterally slidable relative to its mounting points, so that the shade may be laterally positioned such as to screen the seat upholstery from the direct action of the sun rays, according to the angle of incidence of the sun rays.

When not in use, the shade, being attached to a spring biased roller is automatically wound back on the roller out of the way of the occupants of the vehicle.

The many objects and advantages of the present invention will become readily apparent to those skilled in the art when the following description of the best modes contemplated for practicing the invention is read in conjunction with the accompanying drawing wherein:

BRIEF DESCRIPTION OF THE DRAWING

FIG. 1 is a schematic view of the front seat of a motor vehicle provided with the roller shade of the present invention shown in its retracted position;

FIG. 2 is a view similar to FIG. 1, but showing the retractable shade extended in use;

FIG. 3 is a view similar to FIG. 2 but showing a modification of the invention;

FIG. 4 is a view similar to FIG. 2 but showing the invention in use for shading the front seat and the corresponding rear seat of a vehicle;

FIG. 5 is a view similar to FIG. 4 showing another modification of the invetion;

FIG. 6 is a detailed top plan view of an example of retractable shade according to the present invention;

FIG. 7 is an end view thereof;

FIG. 8 is a partial view similar to FIG. 7, but showing the mounting brackets thereof in a reversed position; and FIG. 9 is a schematic top view of a seat provided with the retractable shade of the invention.

DETAILED DESCRIPTION OF THE PREFERRED EMBODIMENTS

Referring now to the drawing, and more particularly to FIGS. 1 and 2, there is illustrated a vehicle seat 10 which consists, conventionally, of a seat proper 12 and a seat back 14. The retractable shade 15 of the invention comprises, as best shown at FIGS. 6–7, a spring wound roller 16, supported by a pair of end flanges 18 and 20, in turn mounted on the end of a rod 22, slidably supported by a pair of support brackets 24.

The roller 16 is identical or similar to well known conventional window shade rollers, and has a sheet of pliable material or shade 26 normally wound about the periphery of the roller 16. The roller 16 is rotatable about a longitudinal axial shaft 28 projecting from both ends of the roller 16, means such as a spring 30 normally biasing the roller 16 in the direction that winds the shade 26 about the periphery of the roller. As previously mentioned, a conventional window blind or shade may be used, including the ratchet mechanism generally associated with such a wind-up blind or shade, although for the purpose of the invention the ratchet may be omitted.

One end of the shaft 28 is circularly cylindrical, as shown at 32, and engages an aperture 34 in the end flange 18. The other end of the shaft 28 has a square or flatened end 36 engaging a square or rectangular aperture 38 in the end flange 20. The rod 22 has a plurality of peripheral longitudinal grooves 40, four in number in the example illustrated, and the ends of the rods 22 are press-fitted in apertures disposed in bosses 42 and 44 formed integral with the end flanges 18 and 20, respectively, or otherwise fastened thereto, proximate an edge of the end flanges. The bosses 42 and 44, in which the ends of the rod 22 are press-fitted, are provided with generally X-shaped bores 46 and 48, respectively, having radial projections or webs 49 engaging the grooves 40 of the rod 22. In this manner, the rod 22 fixedly carries the roller 16 and the shaft 28 thereof substantially parallel to the rod.

The mounting brackets 24 are substantially U-shaped in profile and are adjustable in width by being each provided with a pair of generally L-shaped clamp members 50 and 52 adjustably held together by means of a bolt 54 having a square body portion, not shown, passed through an appropriately square aperture in the L-shaped clamp member 52 and a threaded body portion passed through a slot 56 formed in the L-shaped clamp member 50, a wing nut 58 threading on the threaded end of the bolt 54 (FIG. 7). The L-shaped clamp member 50 has a curved integral portion 60 slidably and, preferably, rotatably accepting the rod 22, thus allowing the end flanges 18 and 20 and the roller 16 to rotate downwardly beneath the seat skirt and out of the way when not in use. If so desired, a pin, not shown, or alternatively a web, not shown, formed on the internal surface of the rod bearing surface of the curved portion 60, may be disposed such as to engage one of the grooves 40, thus preventing the rod 20 from rotating within the rod bearing surface of the curved portion 60.

The clamp member 50 has an integral sidewall portion 62 disposed substantially at right angle to the main body portion of the clamp member, and the clamp member 52 has a similarly disposed sidewall portion 64. Both sidewalls 62 and 64 have an inwardly bent integral flange section 66 and 68 respectively, and the sidewall 64 is further provided with an outwardly extending flange portion 70.

The retractable shade 15 is held in position by being clamped by means of the bracket 24 to the bottom edge, for example of the skirt 72 of the vehicle front seat 10 (FIGS. 1 and 7). The sidewall 64 of the L-shaped clamp member 52, and more particularly the flange 68 thereof, engages the interior surface of the seat skirt 72, while the sidewall 62 of the L-shaped clamp member 50, and more particularly the edge of the flange 66 thereof, engages the front, generally covered with upholstery material, of the seat skirt 72. Tightening the wing nut 58 clamps the L-shaped clamp member 50 and 52 together with an appropriate pressure exerted against the inner and outer surfaces of the skirt 72, the edge of the flanges 66 and 68 of the clamp resiliently deforming the surface of the upholstery concavely to provide a better grip. If so desired, the engaging surfaces of the L-shaped clamp members 50 and 52 are provided with laterally extending grooves and corresponding ridges, as shown at 74 at FIG. 6 for mutual interlocking between the surfaces in contact and for preventing relative slippage. The normally outwardly extending flange section 70 of the sidewall 64 of the adjustable L-shaped clamp portion 52 enables the clamping brackets 24, by simply rotating or reversing the L-ahsped clamp portion 62 180° about the axis of the bolt 54, to be adaptable to an edge of the seat skirt 72 which is relatively thin, as illustrated at FIG. 8.

The skirt 72 of conventional motor car seats is formed by a portion of the seat upholstery, sometimes provided with an underlying padding, projecting downwardly and being doubled over a bottom member of the seat frame, the edge of the upholstery being stapled or fastened in some manner to the inside surface of the seat frame or to the reverse side of the skirt. Consequently, the mounting clamp brackets 24 are solidly fastened to a relatively rigid section of the seat skirt, the bottom edge of a front seat, the sidewalls of the adjustable clamps, and more particularly the projecting glanges 66 and 68 or 70, permitting to compensate for any resiliency or flexibility of the material and padding of the upholstery at the bottom of the shirt.

As shown at FIGS. 6 and 7, the edge of the free end of the sheet of blind material 26 is provided with a relatively rigid member 74 disposed in an edge gusset 76, the length of the rigid member 74 being more than the distance separating the end flanges 18 and 20 when the roller 16 is mounted in position. In this manner, when the sheet of blind material 26 is wound about the periphery of the roller 16 under the action of the spring 30, the elongated rigid member 74 acts as a stop preventing the spring 30 from further unwinding, as a result of engagement of the ends of the member 74 with the edges of the end plates 18 and 20. The free end of the sheet 26 has a strip of mutually adhesive fabric, generally known under the trademark "Velcro" or "Velcron", sewn, stapled, or otherwise attached to the end edge thereof over the gusset 76, as shown at 78, and a strip 80 is fastened to the back of the seat back 14 (FIG. 1), preferably proximate the top edge thereof.

Normally and when not in use, the blind 26 is wound about the roller 16, and is out of the way of the occupants of the vehicle. When it is desired to use the blind of the invention, the sheet of blind material 26 is pulled, thus unwinding from the roller 16, and the end thereof is attached, by means of the mutually engaging strips of fabric 78 and 80 over the top of the seat back 14, as illustrated at FIG. 2. The surface of the seat proper 12 and of the seat back 14 is thus shielded from sun rays and remains relatively cool.

As illustrated at FIG. 3, the wound-up blind roller 15 may be mounted on the seat back 14, preferably at the bottom thereof, and the sheet of blind material 26 may be extended over the top of the seat back 14 and stretched from the top of the seat back 14 to the front of the seat 10, the strip of mutually engaging fabric 80 being attached preferably to the bottom of the front of the seat.

FIG. 4 illustrates, schematically, an example of the invention adapted to shade both a front seat 10 and a corresponding rear seat 11 of a motor vehicle. A strip of mutually adhesive fabric 80 is attached to the back of the front seat back 14, and another strip 82 of the same material is attached to the top of the rear seat back 14'. The length of blind material 26 is such that it may be extended over both the front seat 10 and the rear seat 11, if so desired or extended over only the front seat.

FIG. 5 illustrates a further modification wherein the wind-up roller blind 15 is permanently mounted in back of the rear seat back 14' by, for example, being attached to the bottom surface of the shelf 84 normally disposed between the rear seat back and the rear window of a motor vehicle. A slot or space 86 is disposed in the edge of the shelf 84 permitting to extend the length of blind material 26 over the rear seat 11 and the front seat 10, for attachment of the end thereof to the bottom of the front of the front seat.

As the clamping brackets 24 support the blind roller 16 through the intermediary of the rod 22 which is slidably disposed in the rod bearing portion 60 of the brackets, by fastening the clamping brackets 24 at an intermediary lateral position on the skirt 72 of a seat, the rod 22 and the roller 16 may be laterally displaced such that the blind 26 may be extended over the seat 10 slightly out of center on one side, as shown in full line at FIG. 9, or slightly out of center on the other side, as shown in phantom line at FIG. 9, with the result that the blind may be laterally positioned to mask obliquely impinging sun rays, according to the position of the sun relative to the vehicle.

It will be readily apparent to those skilled in the art that means other than the mutually adhesive fabric may be used for attaching the end of the blind to a portion of the vehicle interior, such as snaps, hooks and the like, and that the blind may be attached to a convenient portion of the vehicle other than to the seat itself by means of brackets other than those described in details, without departing from the spirit of the present invention.

It will also be readily apparent that although the invention has been described and illustrated in use for shading seats including seat backs without headrests, the invention is also applicable to motor vehicles and airplanes having seat backs provided with headrests.

Having thus described the present invention by way of examples of typical structural embodiments thereof, modifications whereof will be apparent to those skilled in the art, what is claimed as new is as follows:

1. A retractable shade for a seat having a front skirt, said shade comprising a roller, a sheet of pliable material normally wound about said roller, a shaft extending longitudinally through said roller and rotatably supporting said roller, biasing means normally urging said roller in a direction winding said sheet of pliable material about said roller, a pair of end flanges fixedly supporting said shaft at each end thereof, a rod member having a plurality of peripheral longitudinal grooves, said rod member being fixedly attached at each end to one of said flanges by being pressed into apertures in said flanges, said apertures having web portions extending in said grooves, said rod member extending substantially parallel to said roller and shaft in close proximity with said roller, a pair of mounting brackets slidably supporting said rod member, means for removably and adjustably attaching said mounting brackets to the front portion of said front skirt, and means for removably attaching the free end of said sheet of pliable material at least to the top portion of the back of said seat when unwound from said roller, wherein said means for removably and adjustably attaching said end flanges to the front portion of said seat skirt comprises a pair of substantially U-shaped brackets each comprising a substantially L-shaped fixed member having a sidewall engaged with the front surface of said seat skirt front portion and a bearing member slidably supporting said rod member, for permitting said rod member, said end flanges and said roller to be adjustably positioned laterally relative to said brackets, a substantially L-shaped adjustable member having a sidewall engageable with the rear surface of said seat skirt front portion, each of said fixed and adjustable members having a bottom wall portion in engagement with the bottom wall portion of the other member and means for fastening said bottom wall portions together with said seat skirt portion clamped between said sidewalls.

2. The retractable shade of claim 1 wherein said means for removably attaching the free end of said sheet of pliable material at least to the top portion of the back of said seat comprises a length of mutually adhesive fabric attached to the free end of said sheet and a length of mutually adhesive fabric attached to the seat back.

3. The retractable shade of claim 2 further comprising a length of substantially rigid material attached at the free end of said sheet of pliable material, said length of rigid material projecting beyond the side edges of said sheet such as to engage said end flanges when said sheet is wound on said roller.

4. The retractable shade of claim 1 further comprising an integral flange section depending from said sidewall extending toward said surface of said seat skirt for resiliently concavely deforming said surface.

5. A retractable shade for vehicle seat comprising a roller, a sheet of pliable material normally wound about said roller, a shaft extending longitudinally through said roller and rotatably supporting said roller, biasing means normally urging said roller in a direction winding said sheet of pliable material about said roller, a pair of end flanges fixedly supporting said shaft at each end thereof, means for adjustably attaching said end flanges to an interior portion of said vehicle and means for removably attaching the free end of said sheet of pliable material to another interior portion of said vehicle when unwound from said roller with said sheet of pliable material being supported by the back of a seat away from the surface of the seat proper and seat back, wherein said means for adjustably attaching said end flanges to a portion of said vehicle comprises a pair of substantially U-shaped brackets each comprising a substantially L-shaped fixed member having a sidewall engaged with an exterior surface of a seat skirt and a bearing member slidably supporting a rod member extending substantially parallel to said roller and affixed at each end to one of said end flanges, whereby said rod member, end flanges and roller are laterally adjustable in position relative to said seat, a substantially L-shaped adjustable member having a sidewall engageable with the corresponding inner surface of said seat skirt, each of said fixed and adjustable members having a bottom wall portion in engagement with the bottom wall portion of the other member, means for fastening said bottom wall portions together with said skirt clamped between said sidewalls, and an integral flange section depending from at least one said sidewall and extending toward said surface of said seat skirt for resiliently concavely deforming said surface.

6. The retractable shade of claim 5 wherein said means for removably attaching the free end of said sheet of pliable material comprises a length of mutually adhesive fabric attached to the free end of said sheet and a length of mutually adhesive fabric attached to said vehicle other portion.

7. The retractable shade of claim 7 further comprising a length of substantially rigid material attached at the free end of said sheet of pliable material, said length of rigid material projecting beyond the side edges of said sheet such as to engage said end flanges when said sheet is wound on said roller.

* * * * *

UNITED STATES PATENT AND TRADEMARK OFFICE
CERTIFICATE OF CORRECTION

PATENT NO. : 4,118,066
DATED : October 3, 1978
INVENTOR(S) : Cyril T. Ricke

It is certified that error appears in the above-identified patent and that said Letters Patent are hereby corrected as shown below:

Column 2, line 43, correct the spelling of "flattened".

Column 3, line 40, correct the spelling of "L-shaped".

line 53, correct the spelling of "flanges".

line 56, correct the spelling of "skirt".

Column 6, line 47, change "7" to --6--.

Signed and Sealed this

Twentieth Day of February 1979

[SEAL]

Attest:

RUTH C. MASON
Attesting Officer

DONALD W. BANNER
Commissioner of Patents and Trademarks